Dec. 22, 1936.  E. O'BRIEN  2,065,150
FRUIT CONTAINER
Filed Jan. 2, 1936
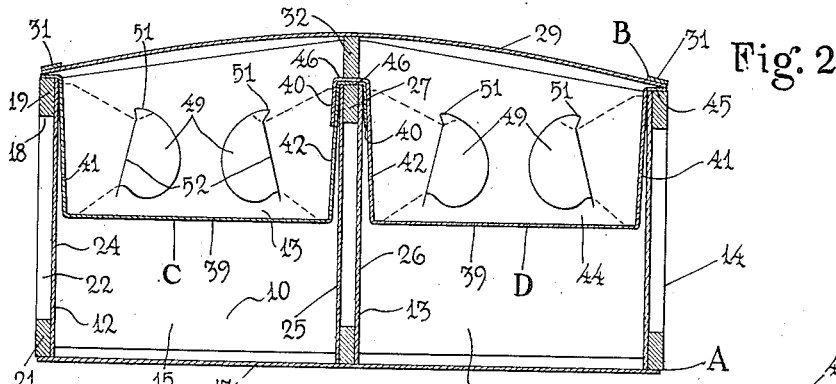
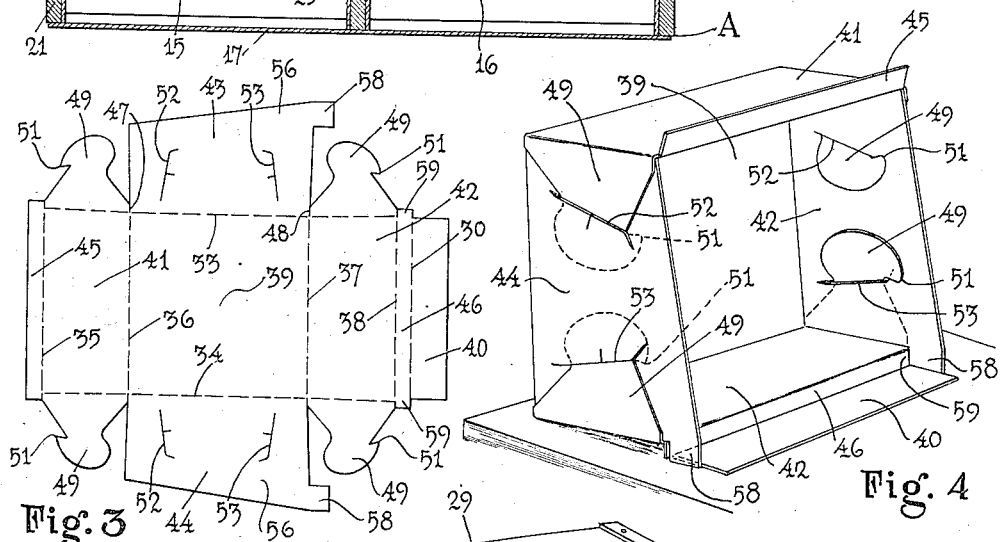
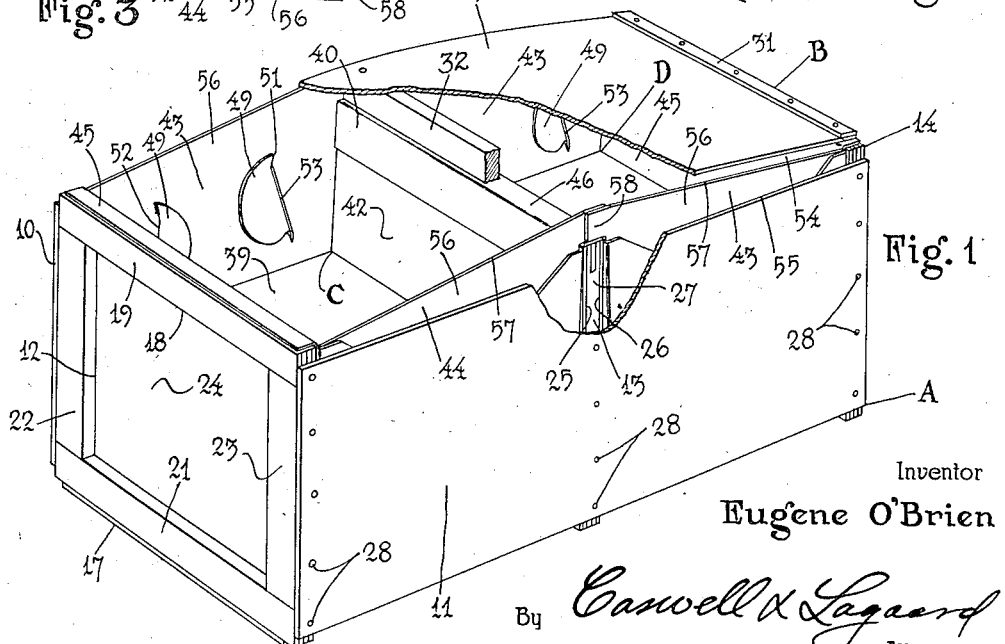
Inventor
Eugene O'Brien
By Caswell & Lagaard
Attorneys Patented Dec. 22, 1936

2,065,150

UNITED STATES PATENT OFFICE 2,065,150

FRUIT CONTAINER

Eugene O'Brien, Eau Claire, Wis.

Application January 2, 1936, Serial No. 57,173

9 Claims. (Cl. 229—15)

My invention relates to fruit containers and has for an object to provide a container particularly adapted for shipping delicate fruits such as tangerines and other fruits susceptible to injury from pressure or crushing.

Another object of the invention resides in providing a container embodying as a part thereof an ordinary two compartment fruit box or crate of standard specifications.

A feature of the invention resides in providing a fruit container in which the number of layers of fruit resting upon the lowermost layer is greatly reduced.

Another object of the invention resides in providing a container which utilizes a crown type of closure.

A still further object of the invention resides in providing a container including a box open at the top, together with one or more trays set into the box from the top and forming an auxiliary bottom within the container at an elevation above the bottom of the box.

An object of the invention resides in supporting the tray in the conventional fruit box in a manner not to require reconstruction or alteration of the fruit box.

A still further object of the invention resides in constructing the trays from paper board, fiber board or some other suitable material and in folding the same to form the walls and supporting means of the trays.

Another object of the invention resides in constructing the end walls of the trays with flanges adapted to overlie the upper edges of the cross walls of the box and held in position by means of the closure of the box.

An object of the invention resides in constructing the side walls of the trays with extensions adapted to close the spaces formed between the longitudinal walls of the box and the closure when a crown type of closure is used.

A feature of the invention resides in providing a tray adapted to be used for display purposes independently of the fruit box.

Other objects of the invention reside in the novel combination and arrangement of parts and in the details of construction hereinafter illustrated and/or described.

In the drawing:

Fig. 1 is a perspective view of a fruit container illustrating an embodiment of my invention and with parts cut away to show the construction of the container.

Fig. 2 is a longitudinal medial sectional view of the structure shown in Fig. 1.

Fig. 3 is a developed view of one of the blanks from which the trays used with the invention are constructed.

Fig. 4 is a perspective view of one of the trays removed from the box and disposed in display position.

In the shipping of tangerines and other delicate fruits in the ordinary crates or fruit boxes used for the purpose, considerable damage and loss of goods results through pressure upon the fruit at the lowermost portion of the crate or box caused by the weight of the fruit superimposing the same. The present invention overcomes this disadvantage in a manner which will become readily apparent from the following description and at the same time provides a construction which may be used with the standard fruit box.

My invention comprises a box A which may be the standard fruit box and which is open at the top. This box is closed by a separate closure B adapted to be secured to the box itself. In conjunction with the box A are utilized two trays C and D which are inserted into the box through the upper open portion thereof and which are held in place in a suspended manner by means of the closure B. These various parts will now be described in detail.

The box A consists of longitudinal walls 10 and 11 and three cross walls 12, 13 and 14 connected thereto. The cross walls 12 and 14 form the end walls of the box A while the cross wall 13 serves as a partition dividing the box into two compartments 15 and 16. A bottom 17 closes the lowermost portion of the box while the uppermost portion thereof is open as previously stated and is adapted to be closed by means of closure B.

End wall 12 of box A is constructed from a wood frame 18 which is provided with rails 19 and 21 mortised into stiles 22 and 23. A sheet of ply wood 24 is nailed to the frame 18 and is disposed upon the interior of the box. The end wall 14 is constructed in identically the same manner while the partition 13 is also constructed similar to the end wall 12 excepting that the same is provided with two sheets of ply wood 25 and 26, one upon each side of the frame 27. The walls 10, 11 and the bottom 17 are all constructed of ply wood and may be made in one or more sections as found desirable. These walls are all nailed to the frames of the various cross walls 12, 13 and 14 by means of nails 28.

The closure B consists of a sheet of ply wood 29 which is provided at its ends with cleats 31 secured to the outer surface thereof. At the middle of the sheet 29 and upon the inner surface thereof is provided another cleat 32 to which the sheet 29 is nailed. This cleat is directly opposite the partion 13 while the cleats 31 are opposite the end walls 12 and 14. The walls 12, 13 and 14 are all of the same height and when the closure is applied, cleat 32 being on the inner surface of the closure raises the center of the closure giving the same a bowed effect, as shown in Fig. 1. This type of closure is known in the trade as a crown type of closure and is employed for the purpose of holding the fruit firmly in position within the container.

Inasmuch as both trays C and D are identical in construction, only the tray C will be described in detail which is shown detached from the box A in Fig. 4. This tray is constructed from the blank illustrated in Fig. 3 which is scored longitudinally along two lines 33 and 34 and transversely along five lines 35, 36, 37, 38 and 39. These score lines divide the blank into a bottom 39, end walls 41 and 42, side walls 43 and 44, flanges 45 and 46 connected to the free ends of the end walls 41 and 42 and a flap 40. The blank is cut at the corners thereof to separate the side walls 43 and 44 from the blank along lines 47 and 48 which lie in continuation of the score lines 36 and 37. The blank is further cut between the shear lines 47 and 48 and the score lines 33 and 34 to form tongues 49 connected to the end walls 41 and 42. These tongues are adapted to enter slots 52 and 53 cut in the side walls 43 and 44 and are provided with hooks 51 adapted to engage the said side walls at the ends of the slots 52 and 53 to hold the walls in erected position.

The side and end walls of the tray C may be constructed rectangular, if desired, and when so constructed, the tray is made slightly smaller than the inner dimensions of the compartments 15 and 16 of box A. However, the said walls are preferably constructed slightly tapering and in such case the lower ends are somewhat smaller than the inner dimensions of the compartments 15 and 16 of the box A and the upper dimensions are such as to cause the box to be snugly received within the said compartments.

Flanges 45 and 46 of the tray C rest upon the upper edges of the two cross walls 12 and 13 of the box A and the tray C is thereby suspended from these flanges within the interior of the box. The said tray is held in position within the box by means of the closure B as will be presently described in detail.

When the closure B is applied as shown in Fig. 1, the bowing of the same leaves spaces 54 between the said closure and the upper edges 55 of the longitudinal walls 10 and 11 of the box. For the purpose of closing these spaces the two side walls 43 and 44 of crate C are constructed with triangular shaped extensions 56 which are integral with said walls and which extend outwardly beyond the surfaces of the flanges 45 and 46. The upper edges 57 of these extensions extend along the inner surface of the portion 29 of closure B and thus close the spaces 54. At the ends of the extensions 56 are provided legs 58 which overlie the partition 13 when the tray is installed in the box. Flange 46 is of sufficient length so that the ends 59 thereof extend beneath the legs 58 and are held in extended position by means thereof.

The method of using the invention is as follows: Where it becomes desirable to ship tangerines or other fruits, a standard fruit box is used which is filled to an elevation corresponding with the bottom 39 of the tray C when the same is placed within the box. Both the compartments 15 and 16 of the box are so filled. The two trays C and D are next filled with fruit to the desired height. Tray C is then inserted into the compartment 15 with the legs 58 overlying the partition 13 and with the flanges 45 and 46 overlying the upper edges of the cross walls 12 and 13. Tray D is then similarly inserted with the legs 58 thereof straddling the corresponding legs of the tray C and with the flange 45 thereof resting upon the flange 46 of tray C and with its other flange resting upon the upper edge of the cross wall 14. Due to the fact that the two flanges 46 of trays C and D extend beneath the legs 58 the said flanges are held in positions at right angles to the walls from which they issue and the said flanges remain in proper position while the closure is being applied. Closure B is next laid across the top of the box with cleat 32 resting upon the flange 46 of tray D. The end of the said closure overlying end wall 14 of box A is next brought down to the flange 45 of tray D and the same nailed down to the frame 18 of said cross wall by means of nails 61. These nails pass through the flange 45 of tray D and securely hold the tray attached to the said end wall. After the closure has been so attached the other end thereof is brought down into engagement with flange 45 of tray C and this end of the closure nailed down to the frame 18 of end wall 12 in the same manner. By the bowing of the closure B pressure is exerted upon the cleat 32 which securely holds the flanges 46 of trays C and D in position. By means of this simple construction the two trays are firmly held in position and the bottoms 39 of these trays support the fruit carried by the trays independently of the bottom proper 17 of the box A.

When the container arrives at destination the closure B is removed by means of any suitable pry and access gained to the contents of the container. Since the cleat 32 is not nailed to the box proper it is a simple matter to remove the cover. As soon as the cover is off the flanges 45 and 46 of the two trays C and D are free and the said trays may be readily removed from the box. If desired, a portion of the contents of one of the trays may be replaced in the compartment from which the tray was taken and the tray arranged as shown in Fig. 4 for display purposes with the remainder of the contents therein. When so disposed the tray rests upon the corner formed through the score line 37 of the blank and the legs 58 which hold the container in an angular position as illustrated. Advertising may be placed upon the flap 40 which becomes visible when the tray is used for display purposes.

My invention is highly advantageous in that it saves spoilage of fruit through pressure during shipment thereof. By means of the trays used with my invention portions of the fruit may be easily removed from the container. The trays of my invention can be used with the standard fruit box and do not require alteration or reconstruction thereof. By keeping a supply of trays on hand the ordinary fruit box can be readily adapted for the efficient and convenient handling of delicate fruits by merely inserting the trays into the compartments of the box and applying the covers in the customary manner.

Changes in the specific form of my invention, as herein disclosed, may be made within the scope of what is claimed without departing from the spirit of my invention.

Having described my invention, what I claim as new and desire to protect by Letters Patent is:

1. In a fruit container, a box having a bottom, longitudinal walls and cross walls, and open at the top, a tray of lesser depth than the depth of the box and insertable into the box from the top, said tray having flanges overlying the upper edges of the cross walls of the box and a closure secured to the cross walls and holding said flanges in position thereon to support the tray within the box.

2. In a fruit container, a box having a bottom, longitudinal walls, and three cross walls, two of said cross walls serving as end walls and the other as a partition and dividing the box into two compartments, said box being open at the top, two trays, one for each compartment, said trays being of a depth less than the depth of the box and being insertable into the box from the top, said trays having flanges on opposite walls thereof, a flange of one of said trays overlying the upper edge of one of said end walls of the box, a flange of the other tray overlying the upper edge of the other end wall of the box and the flanges on opposite sides of the trays both overlying the upper edge of the partition, and a closure overlying the upper edges of said cross walls and said flanges and being secured to the box to hold the trays in position within the box.

3. In a fruit container, a box having a bottom, longitudinal walls, and three cross walls, two of said cross walls serving as end walls and the other as a partition and dividing the box into two compartments, said box being open at the top, two trays, one for each compartment, said trays being of a depth less than the depth of the box and being insertable into the box from the top, said trays being constructed with a bottom, side and end walls and open at the top, means secured to the end walls of the trays and engaging the cross walls of the box for holding the trays in position within the box, a crowned closure for the box spaced from the longitudinal walls in the vicinity of the partition, and extensions on the side walls of the trays, said extensions closing the spaces between the longitudinal walls of the box and the closure.

4. In a fruit container, a box having a bottom, longitudinal walls, and three cross walls, two of said cross walls serving as end walls and the other as a partition and dividing the box into two compartments, said box being open at the top, two trays, one for each compartment, said trays being of a depth less than the depth of the box and being insertable into the box from the top, said trays being constructed with a bottom, side and end walls and open at the top, means secured to the end walls of the trays and engaging the cross walls of the box for holding the trays in position within the box, a crowned closure for the box overlying the end walls of the box, a cleat secured to said closure and overlying the partition of the box and maintaining the closure in bowed position and spaced from the longitudinal walls of the box, and triangular shaped extensions on the side walls of the trays, said extensions closing the spaces between the longitudinal walls of the box and the closure.

5. In a fruit container, a box having a bottom, longitudinal walls, and three cross walls, two of said cross walls serving as end walls and the other as a partition and dividing the box into two compartments, said box being open at the top, two trays, one for each compartment, said trays being of a depth less than the depth of the box and being insertable into the box from the top, said trays being constructed with a bottom, side and end walls and open at the top, flanges issuing outwardly from the end walls of the trays and overlying the upper edges of the cross walls of the box, a cleat overlying the upper edge of the partition and the flanges associated therewith, and a bowed closure overlying the upper edges of the end walls of the box, the flanges associated therewith and said cleat and being secured to the box to hold the trays suspended within the box by means of said flanges.

6. In a fruit container, a box having a bottom, longitudinal walls, and three cross walls, two of said cross walls serving as end walls and the other as a partition and dividing the box into two compartments, said box being open at the top, two trays, one for each compartment, said trays being of a depth less than the depth of the box and being insertable into the box from the top, said trays being constructed with a bottom, side and end walls and open at the top, flanges issuing outwardly from the end walls of the trays and overlying the upper edges of the cross walls of the box, a cleat overlying the upper edge of the partition and the flanges associated therewith, a bowed closure overlying the upper edges of the end walls of the box, the flanges associated therewith and said cleat and being secured to the box to hold the trays suspended within the box by means of said flanges, said closure being spaced from the longitudinal walls of the box, and extensions on the side walls of the trays, said extensions closing the spaces between the longitudinal walls of the box and the closure.

7. In a fruit container, a box having a bottom, longitudinal walls, and three cross walls, two of said cross walls serving as end walls and the other as a partition and dividing the box into two compartments, said box being open at the top, two trays, one for each compartment, said trays being of a depth less than the depth of the box and being insertable into the box from the top, said trays being constructed with a bottom, side and end walls and open at the top, flanges issuing outwardly from the end walls of the trays and overlying the upper edges of the cross walls of the box, a cleat overlying the upper edge of the partition and the flanges associated therewith, a bowed closure overlying the upper edges of the end walls of the box, the flanges associated therewith and said cleat and being secured to the box to hold the trays suspended within the box by means of said flanges, said closure being spaced from the longitudinal walls of the box, and extensions on the side walls of the trays, said extensions closing the spaces between the longitudinal walls of the box and the closure, legs on said extensions extending outwardly beyond the walls thereof adjacent the partition of the box, said legs serving to tilt the tray when the tray is resting on the end wall thereof adjacent said legs.

8. In a fruit container, a box having a bottom, longitudinal walls, and three cross walls, two of said cross walls serving as end walls and the other as a partition and dividing the box into two compartments, said box being open at the top, two trays, one for each compartment, said trays being of a depth less than the depth of the box and being insertable into the box from the top, said trays being constructed with a bottom, side and end walls and open at the top, flanges issuing outwardly from the end walls of the trays and overlying the upper edges of the cross walls of the box, a cleat overlying the upper edge of the partition and the flanges associated therewith, a bowed closure overlying the upper edges of the end walls of the box, the flanges associated therewith and said cleat and being secured to the box to hold the trays suspended within the box by means of said flanges, said closure being spaced from the longitudinal walls of the box, and extensions on the side walls of the trays, said extensions closing the spaces between the longitudinal walls of the box and the closure, legs on said extensions extending outwardly beyond the walls thereof adjacent the partition of the box, the flange on the end wall of the tray adjacent said legs extending beneath said legs and being held in extended position thereby.

9. In a fruit container, a box having a bottom, longitudinal walls and cross walls, and open at the top, a tray of lesser depth than the depth of the box and insertable into the box from the top, said tray having a bottom, end walls extending upwardly from the bottom, and flanges extending outwardly from the upper ends of the end walls, said bottom, end walls and flanges being formed of a continuous sheet and being integral with one another, said tray further including side walls attached to the end walls and bottom, said flanges overlying the upper edges of the cross walls of the box and a closure secured to the cross walls of the box and holding said flanges thereon to support the tray within the box.

EUGENE O'BRIEN.